(12) United States Patent
Asplund (10) Patent No.: US 8,763,773 B2
(45) Date of Patent: Jul. 1, 2014

(54) SYSTEM ADAPTED FOR ONE OR MORE ELECTRICALLY PROPELLABLE VEHICLES (ARRANGEMENT FOR METAL DETECTION)

(75) Inventor: Gunnar Asplund, Solna (SE)

(73) Assignee: Elways AB, Solna (SE)

( * ) Notice: Subject to any disclaimer, the term of this patent is extended or adjusted under 35 U.S.C. 154(b) by 0 days.

(21) Appl. No.: 13/638,872

(22) PCT Filed: Mar. 31, 2011

(86) PCT No.: PCT/SE2011/050384
§ 371 (c)(1),
(2), (4) Date: Oct. 1, 2012

(87) PCT Pub. No.: WO2011/123053
PCT Pub. Date: Oct. 6, 2011

(65) Prior Publication Data
US 2013/0020165 A1   Jan. 24, 2013

(30) Foreign Application Priority Data
Apr. 1, 2010   (SE) .................................... 1000330

(51) Int. Cl.
*B60M 1/30* (2006.01)
(52) U.S. Cl.
USPC .................................... 191/22 C; 191/29 R
(58) Field of Classification Search
USPC ....... 191/22 R, 29 R, 30, 31, 32, 33 R; 246/9, 246/65, 67, 69
See application file for complete search history.

(56) References Cited

U.S. PATENT DOCUMENTS

| | | | | |
|---|---|---|---|---|
| 3,914,562 | A * | 10/1975 | Bolger | 191/10 |
| 4,227,595 | A * | 10/1980 | Hamada | 191/2 |
| 4,969,400 | A * | 11/1990 | Burg et al. | 104/247 |
| 5,764,127 | A * | 6/1998 | Hore et al. | 336/143 |
| 6,011,508 | A * | 1/2000 | Perreault et al. | 342/350 |
| 6,374,748 | B1 * | 4/2002 | Shiwaku et al. | 104/243 |
| 8,531,153 | B2 * | 9/2013 | Baarman et al. | 320/108 |
| 8,544,622 | B2 * | 10/2013 | Vollenwyder et al. | 191/10 |

(Continued)

FOREIGN PATENT DOCUMENTS

| | | |
|---|---|---|
| EP | 0950558 A1 | 10/1999 |
| WO | 93/10995 | 6/1993 |
| WO | 2007/056804 A1 | 5/2007 |

OTHER PUBLICATIONS

International Search Report issued on Jul. 5, 2011 by the SE International Searching Authority in International Application No. PCT/SE2011/050384.

(Continued)

*Primary Examiner* — Jason C Smith
(74) *Attorney, Agent, or Firm* — Raymond R. Ferrera; Adams and Reese LLP (57) ABSTRACT

An arrangement for metal detection related to a system adapted for electrically driving a vehicle along a roadway. The vehicle is provided with a current collector which is displaceable up and down and sideways in relation to the direction of transportation, in order to be brought into mechanical and electrical contact with elongated tracks positioned below the roadway and comprising a conductor adapted to be supplied with current and put under voltage. The detecting arrangement, comprises one or more coils arranged for sensing the variation of the magnetic field, based on a horizontal and/or vertical distance between the coils and metal parts belonging to the one or more elongated tracks.

9 Claims, 4 Drawing Sheets

(56) References Cited

U.S. PATENT DOCUMENTS

| | | | |
|---|---|---|---|
| 2011/0061559 A1* | 3/2011 | Lund | 104/119 |
| 2011/0266109 A1* | 11/2011 | Meins et al. | 191/29 R |
| 2013/0020164 A1* | 1/2013 | Asplund | 191/29 R |
| 2013/0020165 A1* | 1/2013 | Asplund | 191/29 R |
| 2013/0126287 A1* | 5/2013 | Kanemori et al. | 191/29 R |

OTHER PUBLICATIONS

Written Opinion of the International Searching Authority issued on Jul. 5, 2011 by the SE International Searching Authority in International Application No. PCT/SE2011/050384.

* cited by examiner

SYSTEM ADAPTED FOR ONE OR MORE ELECTRICALLY PROPELLABLE VEHICLES (ARRANGEMENT FOR METAL DETECTION)

TECHNICAL FIELD OF THE INVENTION

This invention refers generally to an arrangement for metal detection and said arrangement is related to vehicles, specifically to such arrangement which is adapted to be able to elevate and lower contact means and/or a contact device, with each vehicle being adapted to a system appropriate for electrically propellable vehicles and more particularly to such system in which i.a. one or more batteries and/or a set of batteries for power adaptation and energy storage are intended for being able to propel the vehicle rolling along a stretch of a roadway.

Systems of this type are based on utilizing a specifically designed stretch of the road or roadway wherein the upper surface of this stretch of the roadway exhibits at least one track in the form of groove and in which track two or more parallel electric conductors or strips with a conductor surface which may be placed under power or voltage are disposed and which preferably are provided with uncovered and uninsulated contact surface sections.

In accordance with the instructions of the present invention such system is to comprise; "a" a plurality of roadway sections or portions subdividing the total stretch of the roadway and each allotted to one or more electrically conductive surfaces, such as conductors or strips, said roadway portions being connectable over a switch to one or more stationary electric stations serving as a source of power or energy external to vehicles so as thereof i.a. to charge batteries belonging to vehicles and/or sets of batteries intended primarily to propel the vehicle by means of said set of batteries along the stretch of the roadway and its roadway sections or portions and "b" one or more, over an individual electric motor or a plurality of motors, propellable vehicles, wherein each of said vehicles is to exhibit a control circuit controlling the power so as to create a chosen and required propelling effect and/or a speed adaptation and/or control.

The invention is to be applied to stretches of roadways in the form of public and private roads and along their road sections or portions but can also find use in industrial systems having different requirements of power and energy.

The invention has the purpose i.a. of concurrently with power charging of the set of batteries from the external source of energy supplying the power and the energy which will be required for a chosen power requirement for driving the vehicle upwards and over an upwardly rising portion of the roadway.

More particularly the present invention refers to such system in which a non-railbound vehicle, such as a freight vehicle, while being driven along chosen roadway sections or portions by means of its set of batteries allotted to the vehicle, can be supplied with supplementary power and energy, such as from the external source of power or alternatively from a source of power related to the vehicle, such as a diesel generator.

In this regard the present invention proposes a "first" source of power related to the vehicle, such as a diesel generator, a "second" source of power related to the vehicle, such as a battery set, and a "third" source of power separated from the vehicle and being disposed externally, such as two or more conductor surfaces, such as conductors or strips which may be placed under power and be included in tracks or grooves in successive roadway sections or portions, with the conductors of a chosen roadway section being electrically insulated from corresponding conductors in an adjacent (preceding or succeeding) roadway section or portion.

The present invention is based on having two or more conductors built into one track or into individual tracks or grooves in their respective roadway sections or portions, with said track (not the conductors) extending continually from roadway section or portion to roadway section or portion.

The voltage which is allotted to these conductors can be an alternating voltage (AC power) (with a vehicle-related rectifier) or a direct voltage (DC power). In choosing a DC power one of the conductors can be positive, whereas the other conductor can be negative and an additional conductor can be allotted ground potential or zero potential, with the vehicle being operated at twice the value of the voltage.

With alternating voltage to the conductor of the roadway sections said voltage can to advantage be disposed in anti-phase and symmetrically around a ground potential or zero potential.

The motor intended for driving the vehicle can be of the DC power type or of the AC power type, with a converter being connected prior to the motor in the latter case.

BACKGROUND OF THE INVENTION

Methods, arrangements, and structures related to the technical field and character mentioned above are known earlier in a number of different embodiments.

With regard to electrically propellable vehicles, the latter can to advantage be categorized as "railbound vehicles" or as "non-railbound vehicles".

"Railbound vehicles" are driven along their stretch of the roadway and roadway sections on parallel rails disposed in their stretch of the roadway or on parallel rails laid open by sleepers or the like and guiding the fixed pairs of wheels of the vehicle.

"Non-railbound vehicles" are conveyed along their stretch of the roadway and roadway sections or portions over a road and are driven along the roadway sections or portions by steering control equipment associated with the vehicle.

The present invention is based on and is intended to be used in the latter category and technology and is intended to be applied primarily to heavy trucks with or without connected trailers, wherein from patent Publication U.S. Pat. No. 4,129,203-A a vehicle-related arrangement is known for letting contact springs disposed beneath the vehicle be brought upwards and downwards and sideways towards and to mechanical and electrical cooperation with or away from cooperation with non-insulated surface sections of the electric conductors (14) subject to voltage and associated with each roadway section or portion.

Utilizing an insulator (16) in a channel (18) which supports the conductors in the form of rails (14) is indicated here. A cover plate (20) provided with a slit (12) is removably attached to the upper and opposing wall portions of the channel (18), with this cover plate (20) being adjusted to a plane connecting to the upper surface (22) of the roadway section or portion.

Figure 2:
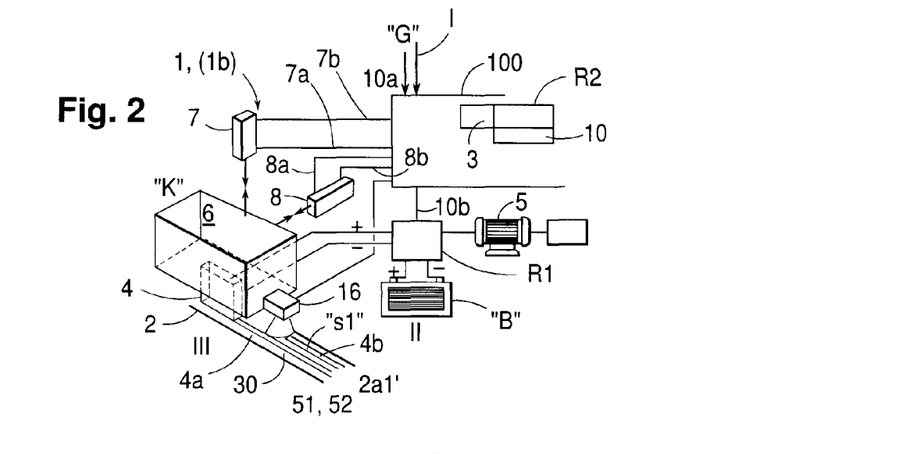
Figure 3:
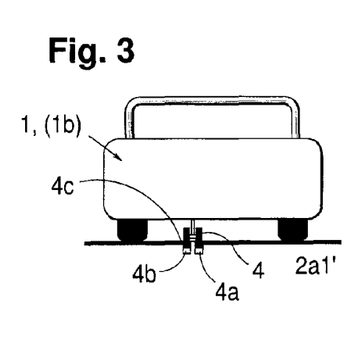
FIG. 3 shows an end view of a vehicle with its downwardly directed contact means or current collectors in the form of sliding contacts, in cooperation with two individual contact surfaces, as conductors, strips or rails, allotted to the road section or portion and being under power or tension.

FIGS. 2 and 3, respectively, in the mentioned patent Publication describe a vehicle-related table (98), to which an arm (10) is rotatably attached (94, 96, 99). Sensors (30) allotted to table (98) generate signals which with regard to their phase and magnitude indicate the direction to and distance from an axis (99) of rotation to a slit (12) in the cover plate (20), which is based on changes in a generated magnetic field. The table (98) and arm (10) can be driven over a designated mechanism (31) by a motor (32) between predetermined limits and limit switches (40, 41) positioned there.

Patent publication WO 93/10995-A discloses an earlier known system for driving electrically controllable vehicles along a road and its roadway sections or portions.

FIG. 9 in the mentioned patent publication clarifies the basic structure of the system.

It is instructed here that the extension (14) of the roadway and its roadway portions are to be provided with electrically conductive road sections (300a-300f), wherein a roadway section may be considered to correspond to a roadway portion.

The vehicle (310) has an electric motor (320) and two (312, 314) or three (312, 312' and 314, respectively) contact springs lying therebelow and being adapted for mechanical and electrical contact with the electrically conductive conductors, whose lengths are adapted to correspond to a chosen length (identically equal lengths) for utilized roadway sections or portions.

The electrically conductive conductors in the road sections (300a-399f) are disposed after each other with an intermediately oriented free space (302a-302e) so as thereby to prevent short circuits in consequence of dragging contact springs (312, 312', 314).

All other road sections (300a, 300d, 300f) are connected here continually to a reference voltage (ground potential), whereas the remaining road sections (300a, 300c, and 300e, respectively) are either directly connectable to a source (440) of DC-voltage or can be connected over a connecting means (304a, 304b, 304c) to any appropriate electric power source (308) when a vehicle is in the vicinity.

When an embodiment having three contact springs is to be utilized the distance between them is to be chosen such, that two or three contacts always are in electric contact with two road sections exhibiting opposite polarities and that neither of the two contacts is to be able to short circuit the open space (302a-302e) between two adjacently positioned sections or portions.

For its function the system here requires specially structured vehicles (310), wherein the chosen distance between front (314) and rear (312, 312') contacts is to be identical and furthermore to be chosen somewhat greater than the equal lengths of the roadway sections (300b, 300d).

Thus, specially structured vehicles with front and rear contacts are required and in which each one of the utilized road sections (300a-300f) is to be chosen having equal lengths and are to be positioned behind each other in the direction of motion of the vehicle with equal mutual free and intermediately lying spaces (302a-302e).

The remainder of the patent Publication shows the existence of a single conductor or rail subjected to voltage in a road section (Page 5, lines 11-13) and that a vehicle is to attract a voltage to a roadway section lying in front (Page 5, lines 19-21; page 6, lines 7-10; page 8, lines 28-32, respectively).

Furthermore it is indicated that bars or rails (16), which may be subjected to voltage, can be provided with side-positioned drainage tracks (Page 9, lines 1-4).

Lack (or presence) of an activating signal is to be able to influence a control unit (38) (Page 8, lines 23-27, respectively).

The necessary distance between vehicle-associated contacts is disclosed in lines 17-20 of page 10, and utilizing activity-initiated radio signals is suggested in lines 2-4 of page 11 and lines 1-16 of page 14, respectively.

Furthermore, in lines 21-23 of page 15 and lines 1-15 of page 16, utilizing a Hall element (240) and connecting it to an amplifier (246) is suggested. Furthermore, alternatives thereof are illustrated in lines 3-9 of page 17.

It is also known to have a vehicle driven electrically along a stretch of roadway by means of inductive transfer of energy active between a vehicle and a roadway section and a road portion lying therebelow.

As examples of this known technology reference is also made to the contents of patent Publications U.S. Pat. No. 3,914,562-A and U.S. Pat. No. 4,007,817-A, respectively.

Patent publication WO 2007/056 804 A1 describes and discloses a plurality of means, devices and/or arrangements, which have relevance when evaluating the significant features related to the prior art and also to the present invention. However, these means, devices and/or arrangements are only mentioned in general terms, and only a few or no suggested structure is disclosed.

The contents of this patent publication will be described in the following and coordinated under the following subsections;

a. Pairs of electrically conductive contacts or strips oriented along a roadway.
   b. Switching means to supply DC power to a roadway related pair of electrically conductive contacts or strips. (DC network).
   c. Vehicle related transmitter.
   d. Vehicle related pick-up arms.
   e. DC-voltage difference between roadway related conductors, contacts or strips.
   f. Orientation of the roadway related conductive strips.
   g. Power supply system.
   h. Detector means or arrangement.
   i. Power supply to an adjacent pair of conducting strips.
   j. Sensor arrangement.
   k. Conditions for activating switching means.
   1. Battery arrangements.
   m. On-board charging engine.
   n. Overload cut-off and re-close switch.
   o. Safe conditions of bare electric roadway related electric conductors or strips.
   p. Use of DC voltage or AC voltage to supply power to the roadway related electric conductors or strips.
   q. Magnetic field sensor.
   r. Snow plough and blower arrangements.
   s. Electrical heating tape.

a. Pairs of Electrically Conductive Conductors or Strips Oriented Along a Roadway.

It is suggested in the above-mentioned International Patent Publication that each pair of electrically conductive strips (members) be electrically insulated from an adjacent and another pair of electrically conductive strips, and wherein a vehicle traveling along said roadway travels over a first pair of electrically conductive strips and then travels over a next adjacent pair of electrically conductive strips and so forth.

b. Switching Means to Supply DC Power to a Roadway Related Pair of Electrically Conductive Contacts or Strips (DC-Network).

A source of direct current electricity (DC-network) is arranged to provide a DC power to the roadway related pairs of electrically conductive strips (members).

Switching means are operative to supply DC power to a pair of electrically conductive strips when a vehicle travels over that pair, said switching means being operative to turn off the supply of DC power to a pair of electrically conductive strips when no vehicle travels over and along that pair of electrically conductive strips.

This improves the safety of the system as suggested (page 2, lines 13-17) in that switching means are operative to supply DC power to said pair of electrically conductive strips (members) only when a vehicle travels over that pair, the switching means being operative to turn off the supply of DC power to a pair of electrically conductive strips when no vehicle travels over that pair of electrically conductive strips.

Said patent Publication further mentions (page 1, lines 7-21) a prior art system for the universal use of electrically powered roadway vehicles. A system of this kind uses a succession of 20 meter long copper strips fixed onto a roadway surface. The respective 20 meter long copper strips were positioned end to end along each lane of the roadway and were electrically insulated from each other.

Alternating current electric power (AC network) was applied to each section or portion.

c. Vehicle-Related Transmitter.

When an appropriate electrically powered vehicle travels over the respective sections of copper strip, a transmitter, mounted to the vehicle, turns on the power supply to the section of copper strips over which the vehicle is traveling.

d. Vehicle Related Pick-Up Arms.

Electrically operated pick-up arms on the vehicle are adapted to contact the copper strips and to obtain electricity from the roadway-related copper strips.

This electricity from the copper strips is used to run a vehicle-related electric motor on board the vehicle (and also to activate vehicle accessories and, optionally, to recharge batteries on the vehicle).

The electricity supply to each copper strip is only turned on during 1.5 seconds, i.e. the time period during which the vehicle passes over that section of copper strips.

In the absence of a signal from a vehicle, the power to that section of copper strip remains off.

In order for the vehicle to be able to pick up electric power from the roadway-related conductors or strips positioned onto the roadway surface, the vehicle may be provided with a pick-up arm located under the vehicle body.

The pick-up arm may comprise a flat plate hinged to the underside of the vehicle.

Two pick-up carbon brushes may be bonded to the plate, for example by an epoxy resin or adhesive.

Leads carry the power from/to each brush to the vehicle (to the motor controller and battery pack of the vehicle). (Page 7, lines 8-13)

The pick-up arm may be retracted and extended automatically.

For example, if the vehicle detects that it is traveling over a pair of electrically conductive strips (members), the pick-up arm may be automatically extended downwardly such that the brushes contact the electrically conductive strips.

In one embodiment, the electrically conductive arm is operated such, that if power is lost for more than a predetermined time period, such as from one-half to one second, the pick-up arm is automatically retracted. (Page 7, lines 14-19)

Vehicles traveling over the pairs of copper strips must be able to pick up electric power from those strips.

A large number of different designs may be used in this regard. However, one possible design is shown with reference to FIG. 2.

In FIG. 2 a vehicle 50 having wheels 52, 54, is provided with a plate 56. Plate 56 may for example be approximately 1.620 mm wide and 100 mm long.

The plate 56, as shown in FIG. 2, stretches approximately across the full width of the vehicle.

The plate 56 may be provided with one or more holes to enable air to pass therethrough to reduce the amount of down force acting on the plate when the vehicle is traveling.

The plate 56 carries two electrically conductive brushes 58, 60.

A gap 62 is located between the brushes 58, 60.

As an example, each brush may be 800 mm wide and the gap may be 20 mm wide.

The gap 62 may be filled with an electrically insulating material, suitably an insulating material that is somewhat soft and can yield without breaking, should it contact an object. (Page 14, lines 7-18)

The use of a wide pick-up plate eliminates the need for a lateral traversing mechanism for the pick up arm.

It also eliminates the need for any device to detect the vehicle's lateral position in relation to the electrically conductive strips.

All a driver has to do to achieve initial contact is to drive along the electrically conductive strips somewhere within the vehicle's track and move the pick-up arm to the down position.

Contact will be maintained so long as the electrically conductive strips remain within the vehicle track.

Automatic steering may be used to assist in this regard on a longer drive. (Page 14, lines 27-30, page 15, lines 1-2)

The brushes 58, 60 must be able to be lowered onto the strips or retracted against the underside of the vehicle.

To this end, the brushes are mounted on a pair of pantograph arms 64, 66.

The pantograph arms keep the plate 56 (and therefore the brushes 58, 60) horizontal.

Appropriate electrical connections may be provided to enable the electrical power picked up from each of the brushes 58, 60 to be transferred to the vehicle.

The pantograph arms may carry appropriate electrical cables to transfer electric power from the brushes to the vehicle. (Page 15, lines 4-10)

e. DC Voltage Difference Between Roadway Related Conductors, Contacts or Strips.

It is further suggested (Page 2, lines 18-22) that preferably a DC power with its voltage exposes a difference between each conductor or strip in a pair of conductors and that said voltage does not exceed 600 volts. More preferably, the DC power and its voltage difference between each conductor in a pair of conductors or strips do not exceed about 450 volts. Suitably, each conductor is at a voltage relevant to ground that does not exceed plus or minus 250 volts, more preferably not exceeding plus or minus 225 volts.

f. Orientation of the Roadway Related Conductive Strips.

The electrically conductive strips may be positioned on the roadway surface such that they are insulated from each other and from ground (the road surface). Suitably, the electrically conductive strips are laid onto an adhesive insulating base which insulates them from each other.

The electrically conductive strips may be bonded to the roadway surface by an epoxy adhesive. Alternatively, the electrically conductive strips may be bonded to tiles that are then placed in or on the roadway surface.

g. Power Supply System.

The power supply system comprises a series of separate, electrically insulated but electrically conductive strips.

Each pair of strips represents a power supply section.

Each pair of strips may be provided with a dedicated source of DC power.

Alternatively, a source of DC power may provide direct current electricity to two or more pairs of strips.

h. Detector Means or Arrangement.

The switching means is suitably operatively associated with a detector means for detecting the presence of a vehicle either about to move onto a pair of conductors or strips or on a pair of conductors.

For example, the coded signal may comprise an oscillating voltage similar to that used by utility companies for control purposes.

Such a control signal may have a frequency in the order of 400 kHz and a voltage of up to about 4 to 20 volts.

It will be understood that the coded signal may utilize different frequencies and different voltages from those given above. (Page 4, lines 19-29)

When one roadway section of conductors or strips is turned on, a control signal may be sent to the power supply for the next section of conductors along the path of travel of the vehicle.

This control signal, sent to the power source for the next section of conductors or strips, is used to turn on the power supply to the next section of conductors, either shortly before or just as the vehicle arrives at the next section of conductors.

Alternatively, the control signal sent to the next section of conductors or strips may turn on the power supply to that next section of conductors a predetermined time after the power supply to the first set of conductors or strips is activated.

In order to detect the arrival or imminent arrival of a vehicle in a section of copper strips, the vehicle may be provided with a coded signal that becomes superimposed on the strips when the vehicle travels over a section or portion of the copper strips and the brushes on the vehicle are in contact with the strips.

The coded signal is received by a detector associated with a corresponding transformer station.

The detector actuates the switching of power up to that particular section of the strips.

i. Power Supply to an Adjacent Pair of Conductive Strips.

The power supply to the next set of conductor means or strips is maintained, provided that the next set of conductors or strips detects that the vehicle enters the next set of conductors or strips within a specified time period after the power supply to the next set of conductors or strips has been turned on.

In this way, if the vehicle turns off the roadway and therefore does not enter the next set of conductors or strips, the next set of conductors or strips will not detect the presence of the vehicle and therefore will shut off the power supply shortly after it has been turned on.

In this embodiment, the adjacent sections of conductors "talk" to each other and interact with each other to turn on the power supply to each roadway section with its strips either just before or just as a vehicle arrives at each section.

j. Sensor Arrangement.

A sensor arrangement may be located towards the "downstream" end of each pair of strips.

The sensor arrangement may, for example, be a current flow sensor, positioned below or adjacent to one of the electrically conductive strips.

When a vehicle is near the end of a roadway section (of electrically conductive strips), the sensor will sense the resultant current flow and then send a signal to the next section of electrically conductive strips to turn on the electricity supply to the next section in "anticipation" of the imminent arrival.

This signal may be sent via cable. The "anticipatory" signal is valid for a short time only, say 2 seconds, and if a vehicle has not arrived at the next section within that time, the next section is turned off.

k. Conditions for Activating Switching Means.

The switching means may be arranged such, that the signal that is used to turn on the next pair of conductive strips must be larger than a predetermined minimum value in order to activate the switching means and turn on the next pair of conductive strips.

In this manner, if the next pair of conductive strips is subject to conditions of high electrical leakage, the signal will be lower than the minimum required to turn on the next pair of strips.

This is effective to minimize excessive electrical leakage which could lead to unacceptable power wastage and/or to damage to the transformer/rectifier. (Page 4, lines 28-29, page 5, lines 1-4).

The use of a coded signal also allows for the possibility of enhanced operation and safety by incorporating an electricity leakage test into the apparatus.

In these instances, an electrical leakage detection means may be provided to prevent the next section of conductors or strips from turning on.

Detection of electrical leakage may occur by requiring the coded signal superimposed on each section of conductors or strips to exceed a predetermined activation threshold value before the next section of conductors or strips will be turned on.

In this fashion, superimposing the coded signal onto the conductors or strips will result in the coded signal representing the criteria not exceeding the predetermined threshold value if conditions of high electric leakage are present. Thus, the next section of conductors or strips will not be turned on in such situations. (Page 8, lines 15-28)

l. Battery Arrangements.

The vehicle may be provided with one or more batteries to store electric power or energy.

The batteries may be charged using electricity received from the roadway related electrically conductive strips.

In some embodiments, the DC voltage of the electrically conductive strips is such that it is equal to the normal charging voltage of each battery pack in the vehicle.

This allows for the vehicle motor to have an essentially seamless transition to and from battery and on-road conductors or strips whenever there is a break and then a resumption of the on-road conductors or strips. (Page 6, lines 29-30, page 7, lines 1-5)

m. On-Board Charging Engine.

The vehicle may alternatively or additionally be provided with one or more of an on-board charging engine or a regenerative braking system to allow for recharging of the batteries. (Page 7, lines 6-7)

n. Overload Cut-Out and Re-Close Switch.

Each transformer may have an overload cut-out and re-close switch.

This switch suitably operates on the DC side of the transformer and a rectifier.

Each DC output line from the transformer and rectifiers may have independent overload switches.

The overload cut-out and re-close switches may be set such that if three re-close attempts are unsuccessfully made, the section is shut down and a signal is automatically sent to the control panel to indicate a fault.

Vehicles may then proceed across this dead section using an on-board battery power system. (Page 12, lines 10-16)

o. Safe Conditions of Bare Electric Roadway Related Electric Conductors or Strips.

A question may be raised as to whether bare electric conductors or strips onto a road surface can be safe? In the system here proposed, they are safe.

In particular, the present invention uses mains power but delivers DC voltage at relatively low volts.

Moreover, each copper conductor or strip is insulated from the roadway surface and from the other copper conductor or strip in its respective pair.

Thus, standing on one of the conductors or strips will not complete any circuit and therefore little or no current will flow through a person standing on one of the copper conductors or strips.

Further, the DC voltage supply to the conductors or strips is created by transforming and rectifying high voltage, three-phase (alternating current) AC power, to give a positive DC power to one conductor or strip and an equal negative DC power to the other conductor or strip in each pair of conductors or strips. (Page 12, lines 19-20)

p. Use of DC Voltage or AC Voltage to Supply Power to the Roadway Related Electric Conductors or Strips.

The use of DC voltage rather than AC voltage contributes to the electrical safety of the system.

The actual DC voltage that is supplied to the pairs of copper conductors or strips will depend upon several factors.

For example, the lower the standard DC voltage selected, the lower will be the perceived electrical safety risk, the lower will be the actual energy leakage, when a roadway is wet and the conductors or strips are on and the fewer the number of battery cells in each vehicle to provide an on-board power supply.

On the other hand, the weight of copper conductors or strips and/or the number of transformers needed for the on-road installation is inversely proportional to the square of the standard voltage.

That is to say, other things being equal, if the voltage is halved, the weight and cost of copper material needed will rise fourfold.

It has been found that possible standard voltages may lie anywhere between about 100 and 600 DC voltage. (Page 12, lines 3-12)

q. Magnetic Field Sensor.

An array of magnetic field sensors may be placed across the front and rear of the vehicle (Page 20, lines 3-9) to sense the position of the conductive strips.

r. Snow Ploughs and Blower Arrangements.

The use of snow ploughs and blower arrangements is also suggested. (Page 21, lines 28-30.)

s. Electrical Heating Tape.

It is also suggested to use an electrical heating tape beside each conductor or strip to aid the clean removal of snow and ice in winter time. (Page 22, lines 1-3.)

This invention concentrates on a stretch of roadway and roadway section having upwardly open tracks connecting to each other from roadway section to roadway section with two or more parallel electric conductors with surfaces placed therein, such as being structured with uninsulated surface sections in each road section, and the invention concerns an arrangement for metal detection as a detecting arrangement, for ensuring a cooperation between a current collector and a track, while utilizing a magnetic field generated adjacent to the track and a coil or coils related to a vehicle.

DISCLOSURE OF THE PRESENT INVENTION

Technical Problem

If the circumstance is considered, that the technical considerations that a person skilled in the relevant technical art will have to carry out in order to offer a solution of one or more posed technical problems are on the one hand initially a necessary insight into the measures and/or the sequence of measures which are to be performed and on the other hand a necessary choice of the one or several means which are required, the following technical problems must be considered to be relevant in consequence hereof in producing the present subject of invention.

Considering the earlier standpoint of technology as it has been described above, it should therefore be seen as a technical problem to be able to understand the significance of, the advantages related to and/or the technical measures and considerations which will be necessary for conveying an electrical, and by i.a. one or more batteries in a set of batteries, conveyable vehicle along a stretch of a roadway and its roadway portions adapted system, which is to comprise; "a" a plurality of road sections or portions for subdividing the stretch of the roadway, wherein each one of these roadway portions is allotted one or more elongated tracks or slits having introduced therein current supplyable and under voltage placeable electrically conductive conductors or strips, connectable over a switch to one or more power sources as stationary electric stations, serving as an external source of power (designated as a third source of power in the following) of the vehicle so as to thereby i.a. charge said set of batteries associated with the vehicle, which set is to be able to propel the vehicle directly along the roadway sections, and "b" one or more vehicles, propellable over an individual electric motor or motors, and wherein the respective vehicle exhibits a control circuit, controlling the necessary power for creating necessary power and/or speed control, indicating the possibility of utilizing equal or different lengths of parallel electric conductors or strips, which may be subjected to electric power or voltages related to mutually electrically insulated road sections so as to therein offer a possibility of choosing the lengths of the conductors and road sections in response to established requirements of a "continuous" supply of energy to the vehicle and its set of batteries and wherein the lengths of the respective roadway sections to advantage can be chosen considerably longer than the total length of the vehicle so that no adaptation of the lengths of the road sections to any standard lengths of the vehicles will be required such as in known technology.

There is a technical problem in, at a vehicle which on its underneath side is provided with a contact means as current collector, which is displaceable upwards and down-wards as well as sideways and crosswise with regard to the direction of transportation of the vehicle, with elongated tracks or gaps supporting, over roadway section after roadway section, underneath the roadway, conductors which can be supplied with current and can be subjected to voltage, such as rails, with said current collector being coordinated with a detecting arrangement, adapted as a metal detector, and related to control the equipment related to the vehicle for creating adaptation of the contact means or current collector so as at least to offer mechanical and electrical contact to said conductor, being able to understand the significance of, the advantages related to and/or the technical measures and considerations which will be required for creating cooperation between the road section associated, at least two, conductors, which may be subjected to voltage, and the contact means or current collector of the vehicle over coordinated sliding contacts or rolling contacts, such as contact springs, for electric cooperation with the respective ones of the conductors or rails, which may be subjected to voltage and having a roadway section supporting the vehicle, over its conductors and its external electric source of power, charge the battery assembly from coupling means or its allotted switch.

There is a technical problem in being able to understand the significance of, the advantages related to and/or the technical measures and considerations which will be required for having one, two or more coils generating a magnetic field be related to a vehicle and having said track shaped as a rail made of metal and having its upper portions intended to connect to the driveway of the road section.

There is a technical problem in being able to understand the significance of, the advantages related to and/or the technical measures and considerations which will be required for having voltage-sensitive inductances related to the vehicle be adapted to sense a changed in a magnetic field by the presence of a metal in a canalization of the tracks.

There is a technical problem in being able to understand the significance of, the advantages related to and/or the technical measures and considerations which will be required for letting a control equipment sense the magnetic field which varies with its horizontal distance to the tracks and/or the field varying with the vertical distance between the canalization and the coils so as at a chosen value to adjust the current collector over allotted auxiliary motors for cooperation with the track and the conductor surface, which may be subjected to electric voltage, and which are disposed in the track.

There is a technical problem in being able to understand the significance of, the advantages related to and/or the technical measures and considerations which will be required for letting the distance between the canalization (the roadway) and the coils related to the vehicles be adapted to less than 15 centimeters, such as between 10 and 1 centimeters.

There is a technical problem in being able to understand the significance of, the advantages related to and/or the technical measures and considerations which will be required for letting said coil consist of two separate coil sections disposed adjacent to each other crosswise to the driving direction of the vehicle.

There is a technical problem in being able to understand the significance of, the advantages related to and/or the technical measures and considerations which will be required for having the control equipment be adapted, when the magnetic field of the coils has been reduced and begins to increase, to affect the auxiliary motors so that they will lower the current collector to contact with conductor surfaces, subjected to voltage.

There is a technical problem in being able to understand the significance of, the advantages related to and/or the technical measures and considerations which will be required for letting the control equipment be adapted to separate a minimum value or a maximum value serving to identify a virtual track from false values.

There is a technical problem in being able to understand the significance of, the advantages related to and/or the technical measures and considerations which will be required for having two coils sensing the field to be disposed at a distance from each other and to be surrounded by a third coil, for generating said magnetic field.

The Solution

As its starting point this invention utilizes the known technology indicated by way of introduction and is based on an arrangement for metal detection, said arrangement is related to a vehicle-related control unit and a vehicle-related charging system for adapting in an electrically, i.a. by one or more batteries or a set of batteries, conveyable vehicle being driven along a stretch of a roadway and its associated roadway sections or portions. This system may comprise; "a" a plurality of roadway sections or portions subdividing the extension or stretch of the roadway, wherein each one of these roadway sections or portions is allotted one or more elongated tracks, grooves or slots, having introduced there in conductor bare surfaces such as conductors or strips, which may be supplied with power of current and which may be placed under voltage by means of a switch to one or more power sources external to the vehicle, such as electric stations, so as thereby to be able to charge said set of batteries allotted to the vehicle, but primarily over said set of batteries driving the vehicle along the extension of the roadway and its roadway portions, and "b" one or more vehicles which may be driven by an electric motor or motors and wherein the respective vehicles exhibit a power control circuit for required power adapted for creating a required power and/or speed control, wherein said vehicle, on its underneath side, is provided with an up and down and sideways, respectively, counted crosswise to the direction of transportation of the vehicle, displaceable contact means as a current collector and in which said elongated tracks, grooves or slots extend along the roadway of the road sections or portions and wherein said contact means is coordinated with vehicle related control equipment or an arrangement for creating an adaptation of the contact means at least to offer mechanical and electrical contact to said conductor or strip, wherein coordination between the voltage-carrying conductor surfaces allotted to the road sections or portions and the contact means of the vehicle occurs over coordinated current collectors or removers, such as in the form of contact springs, adapted for mechanical and electrical cooperation with respective ones of the voltage-carrying conductors or strips.

This invention has the purpose of indicating a further development of the arrangement mentioned above in the system mentioned above and such as proposed embodiments falling within the frame of the basic subject matter of this invention, the characterizing features of which are disclosed in the claims.

According to the invention it is suggested that one or more coils sensing the variation of the magnetic field, is based on a horizontal distance between the coils and metal parts allotted to the canalization and/or a vertical distance between the coils and the canalization, are coordinated with a control equipment.

It is further suggested that one, two or more coils generating a magnetic field are vehicle-related and that said tracks are formed in a rail consisting of metal, the upper portions of which are intended to engage the roadway of the road section.

Further two coils related to the vehicle are adapted to sense the magnetic field and to effect the current collector over associated assisting motors over control equipment for cooperation with the tracks and the conductors, which may be subjected to voltage, and which are introduced into the tracks.

The distance between the roadway and the coils related to the vehicle is adapted to be below 15 centimeters, such as between 10 and 1 centimeters.

Said coil is comprised of two coil sections and one coil for generating the magnetic field and that these are positioned adjacent to each other crosswise to the driving direction of the vehicle.

The control equipment is adapted to affect the assisting motors to lower the current collector into contact with conductors, placed under voltage, when the sensed magnetic field becomes reduced and thereafter to increase towards "0"-potential.

The In control equipment is adapted to sense when a generated counter voltage from the coils from the relevant magnetic field has been reduced and begins to increase towards "0"-potential and thereafter to affect the assisting motors in lowering the current collector into contact with conductors subjected to voltage.

Said control equipment is adapted to discern a minimum value, a maximum value and/or a "0"-value valid for identifying a track from false measuring values.

Said two coils are disposed close to each other and surrounded by a third coil fed by an alternating voltage.

Advantages

The advantages which primarily must be considered to be characterizing of the present invention and the thereby indicated specific significant characteristics are that thereby prerequisites have been created for a vehicle-related arrangement according to the preamble of claim 1. It is here indicated that one, two or more coils generating a magnetic field are to be vehicle-related and that one or more coils, sensing the variation of the magnetic field on the basis of a horizontal distance between the coils and metal parts allotted to the canalization and/or the vertical distance between the coils and the canalization, are coordinated within a control equipment in which said tracks are disposed in a rail consisting of metal and having upper portions intended to connect to the roadway of the road section.

The coils related to the vehicle are to be adapted to sense the varying magnetic field and to actuate the current collector over control equipment, over auxiliary motors, for cooperation with the tracks and the conductors which may be subjected to electric voltage and which are disposed in the tracks or vice versa.

The primary subject matter of a control unit and a charging system related to a vehicle in accordance with the present invention is disclosed in the characterizing portion of the following patent claim 1.

SHORT DESCRIPTION OF THE DRAWINGS

Prior art and presently proposed embodiments, exhibiting the significant characteristics related to the present invention, will now, as an example, be described more specifically with reference to the accompanying drawings in which.

DESCRIPTION OF THE PRESENTLY PROPOSED EMBODIMENTS

By way of introduction it shall be mentioned that in the following description of presently proposed embodiments exhibiting the significant characteristics related to the invention and being clarified by the figures, illustrated in the accompanying drawings, we have chosen terms and specific terminology with the purpose of thereby primarily clarifying the concept of the relevant invention.

However, in this connection it should be noted that the terms chosen here shall not be seen as limiting solely to the terms utilized and chosen here and it should be understood that each such chosen term is to be construed such that it in addition will be able to include all technical equivalents which operate in the same manner or essentially the same manner so as thereby to be able to achieve the same or essentially the same purpose and/or the same technical result.

Thus, with reference to the accompanying drawings, the basic prerequisites of the present invention are shown schematically and in detail, with the significant characteristics related to the invention being concretized in consequence of the now proposed and in the following more specifically described embodiments.

Figure 1A:
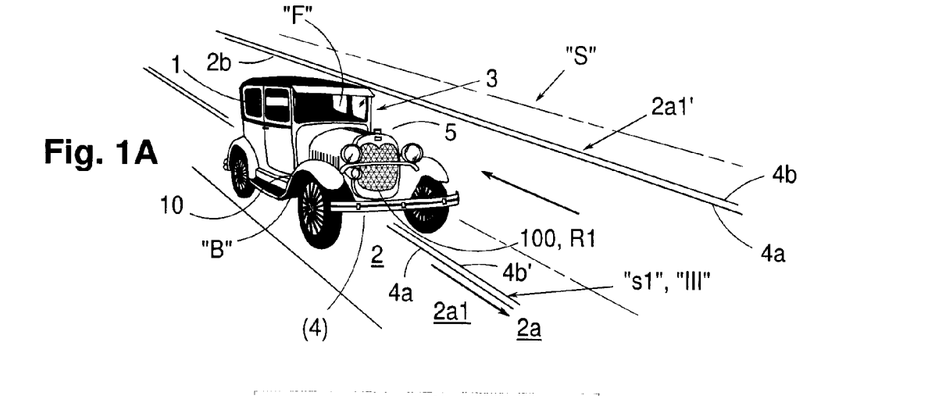
FIG. 1A shows a perspective view of a vehicle, illustrated as a Ford Model A, converted to being battery powered and having an electrically powered engine or motor, a control circuit controlling the power for speed control and adaptation to an instantaneously acting load and necessary power, as well as a control arrangement or control equipment intended for use in driving and steering the vehicle.

Thus, FIG. 1A shows a system "S" adapted for driving an electrically, and by one or more batteries or a set of batteries, propellable vehicle 1 along a stretch of a roadway 2 and its roadway sections or portions 2a1 and 2a1'.

Exteriorly the vehicle 1 consists of a Ford Model A, but this is converted to a battery powered vehicle having continuous access to an external third source of power or energy, which here is designated "III" and "s1" for a stationary station.

The vehicle 1 according to the invention is also to comprise a not shown steering arrangement 3 or steering equipment so that a driver "F" (not shown) can drive and steer the vehicle 1 along said stretch of roadway 2 and its road section or portion 2a1.

Vehicle 1 would also be able to include a gear box and other parts and components which are required for advancing the vehicle, but as these parts are well-known to a person skilled in the art they will not be described in detail.

However, an electrically driven vehicle 1 does not need a gear box as speed control and adapted power can occur over known electric and electronic circuits.

Figure 1B:
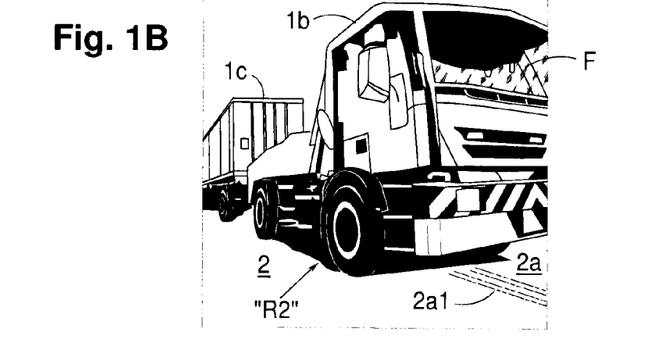
FIG. 1B shows a perspective view of a truck with a trailer and with a control circuit controlling the power in accordance with the basic principles of FIG. 1A.

In the same manner as FIG. 1A, FIG. 1B shows an electrically propellable truck 1b with a connected trailer 1c along the stretch of roadway 2, 2a and its associated roadway section or portion 2a1.

Figure 1C:
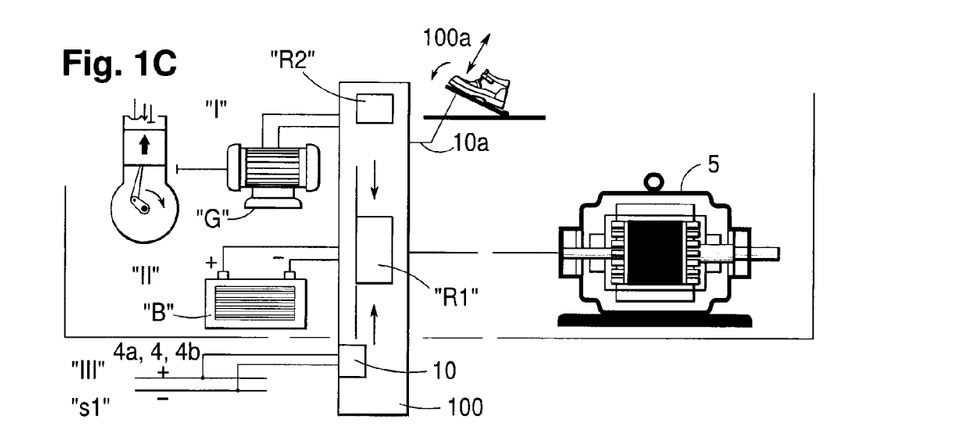
FIG. 1C shows in an overview three vehicle-related power sources, a first one ("I"), a diesel generator, a second one ("II"), a battery or a battery set, and a third one ("III"), an external source of power to the vehicle, feeding electric power to parallel conductor surfaces, such as rails or strips, which may be subjected to power or voltage and which surfaces are arranged in continuous grooves in a roadway and coordinated to a vehicle-related control circuit, which in response to a necessary supplied power to an electric motor makes possible the selection of all or a combination of the power-feeding sources of energy, wherein the power control is illustrated here as a throttle having its motion related to a control circuit "R2"

FIG. 1C clearly shows two vehicle-related and vehicle-associated sources of power, which here are designated "I" and "II", a "first" one in the form of a diesel generator "G", a "second" one in the form of a battery or a set of batteries "B", and a "third" one "III" in the form of a source of power, positioned externally of the vehicle 1, here taking the form of parallel conductive surfaces, such as conductors, rails or strips, which may be subjected to power or voltage over switching means or switches, and introduced into tracks, grooves and/or a cavity along each roadway section or portion along the entire stretch of the road 2.

In FIG. 1C the three sources of power are coordinated to a vehicle-related power control circuit 100, which in response to a power supplied to an electric driving motor 5 chooses all or a combination of the three power feeding energy sources "I", "II" and "III", respectively. Here the power control is illustrated as a throttle 100a, the movement of which upwards and downwards is connected to a control circuit "R2" in power control circuit 100, which in turn is related to a circuit "R1" distributing power and energy between the three power sources.

Figure 1D:
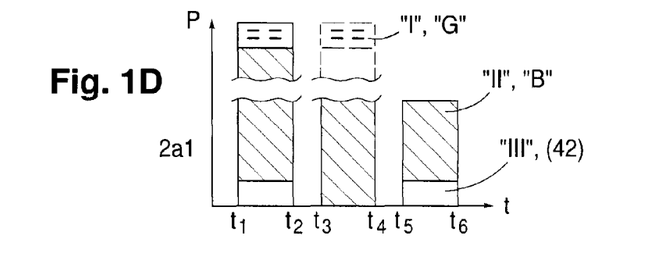
FIG. 1D illustrates a P/t-diagram (power/time) wherein full power or reduced power is to be transferred over the control circuit to the vehicle to pass along a roadway, its road sections or portions and its conductors or strips, FIG. 2 basically shows an electric arrangement related to a vehicle having control equipment for controlling a current collector or commutator arranged against electric contact surfaces, with paired conductors shaped as rails or strips for enabling parallel operation of an electric vehicle-related motor from one or both of the two power sources (first and second ones) related to the vehicle and/or from a stationary (third) source of power related externally to the vehicle or the peripheral (third) source of power.

In a P/t (power/time) diagram FIG. 1D illustrates how full power or reduced power can be distributed and transferred for passage of the vehicle 1, 1b along different roadway sections or portions 2a1 of a roadway or stretch of a roadway 2 with the help of said circuit "R1" and control circuit "R2" and the power control circuit "100".

Between moments $t_1$-$t_2$ it is basically illustrated how a complete removal of power from the three power sources "I", "II" and "III", respectively, can be carried out, with the power taken out from the power source "I" illustrated at the top, the power taken out from power source "II" illustrated there below, and the power taken out from power source "III" illustrated at the bottom.

Reduced removal of power from power sources "I" and "II" is basically illustrated between the points of time $t_3$-$t_4$, whereas power source "III" is shown disconnected in this case.

Reduced removal of power from power sources "II" and "III" is illustrated basically between the points of time $t_5$-$t_6$.

During this time period $t_5$-$t_6$ full power can be achieved from power source "II", and a small surplus can be permitted to be fed to the motor 5 and trickle charge the battery set "II", "B".

The invention is based on that the set of batteries "B" and the second power source "II" but particularly the third power source "III" primarily shall, over the distributing circuit "R1", supply motor 5 with power and for this purpose the set of batteries "II", "B" will have to have stored power and apart from this will have to be dimensioned so as to drive motor 5 at full power.

The set of batteries "II", "B" is primarily to be trickle charged via power source "III", "s1" and secondarily to be trickle charged or charged over power source "I", "G".

The power or energy from power sources "I" and "III" can be chosen to be 5-30% of the power or energy associated with power source "II", "B", such as around 25%.

The supply of power or voltage to motor 5 can be chosen to +400 VDC and −400 VDC, i.e. the voltage value of 800 VDC is to be fed to the motor 5.

System "S" in FIG. 1A is then primarily to comprise "a" one or more over an individual electric motor 5 or motors electrically powerable vehicles 1, 1b, with the respective vehicle exhibiting a power distributing and/or controlling control circuit "R1" within said power control circuit 100 and for creating a necessary power and/or a speed control via a control circuit "R2" and a throttle arrangement 100a.

The necessary output power is to be supplied primarily by the vehicle-internal power source of energy "II", "B", which secondarily is to be placed under trickle charging from the third power source of energy "III", "s1".

Figure 4:
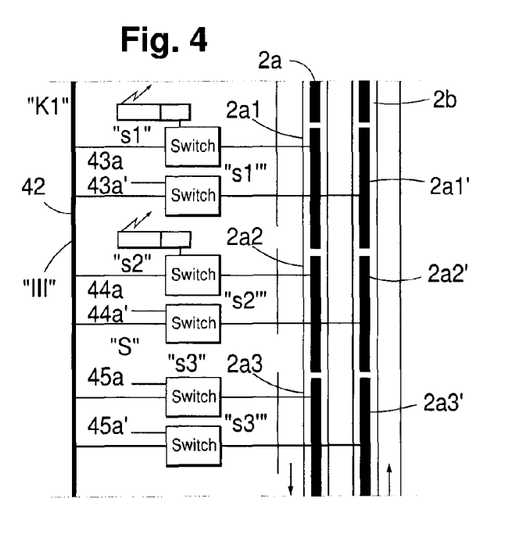
FIG. 4 shows an example of an electric arrangement in which a number of road sections or portions are provided with parallel contact surfaces, as conductors or strips under power or tension, each one being connectable over a switch to its vehicle external or peripheral electric station and in which roadway section or portion after roadway section or portion may be activated and are placed under power of voltage by activating a coupling means or a switch over a control unit as said vehicle passes roadway section after roadway section.

The stretch of a roadway 2 is in FIG. 4 shown divisible into road sections or portions 2a (2a1, 2a2, 2a3); 2b (2a1', 2a2' and 2a3'), wherein each one to advantage can be allotted to an external power source "III", which here is illustrated as a number of electric stations "s1", "s2", "s3"; "s1'", "s2'", "s3'".

Of the third power source "III", "s1", external to the vehicle 1 and/or the first power source "I", "G", associated with the vehicle, one or both can thereby be utilized for supplementary charging the set of batteries "II", "B" of the vehicle 1 during an adapted time sequence of power removal from this set of batteries.

Within the scope of the invention there is also the possibility of in addition to driving the vehicle 1 via the set of batteries "II", "B" and in supplementary charging the set of batteries "II", "B" along the road sections or portions and the stationary electric station "s1" or any of the third power source of energy "III", any additional necessary power and energy for driving the vehicle 1 over a road section or portion 2a1 can be supplied via power source "I", "G" associated with the vehicle.

FIG. 2 basically shows an electrical/mechanical switching arrangement "K" related to a vehicle 1, (1b) in a schematically illustrated vehicle-related arrangement in the form of control equipment 10 for controlling a contact member or a current remover or collector 4 associated with the vehicle 1 and to an electric contact with pairs of contact surfaces, as leads or strips, which may be placed under power or voltage and in the form of rails or strips 4a, 4b for the possible common driving in parallel of an electric motor 5 from the set of batteries "II", "B" and/or from the stationary station "III", "s1" and/or from the diesel generator "I", "G".

In this case current remover or collector 4 is related to a support 6 which may be displaced upwards and downwards vertically by means of a first electric auxiliary motor 7 and may be moved sideways back and forth by a second electric auxiliary motor 8.

The means and the control of auxiliary motors 7, 8, which are required for this movement with the assistance of sensors, are not shown in detail.

Both auxiliary motor 7 and auxiliary motor 8 may be activated in a movement directed forward and backward, wherein a first motion is activated over a first signal on a first conductor 7*a* and a first signal over a first conductor 8*a*, respectively, whereas a second (opposite) motion is activated by means of a second signal over conductors 7*a* and 8*a*, respectively, while the instantaneous setting positions of motors 7, 8 and support 6 are evaluated by one or more, not shown, sensors and are indicated by means of a generated signal on a second conductor or lead 7*b* and 8*b*, respectively.

These signals on the first conductors 7*a*, 8*a* are generated in a central unit or a power control circuit 100 having control equipment 10, and signals on the second conductor 7*b* and 8*b* are generated in the same central circuit 100, while utilizing position sensors (not shown).

Said power control circuit 100 with control equipment 10 is a complex unit, which i.a. over a sensor 16 is to be able to sense the existence of and the orientation of conductor surfaces, as conductors or strips 4*a*, 4*b*, and thereafter lower the current remover or collector 4 by means of auxiliary motor 7 to electric contact with these two conductors 4*a*, 4*b*, which here are illustrated as being placed under voltage.

Over a connection 10*a* to power control circuit 100 and its control circuit "R2" the power and energy which over circuit "R1" distributes the energy sources is supplied to motor 5 and is here controlled by throttle arrangement 100*a*. For this purpose circuit "R2" will have to be controlled directly by said throttle arrangement 100*a* (FIG. 1C) so as to supply motor 5 with required power over circuit "R1".

In the illustrated position the current collector or remover 4 conduct current and voltage from power source "s1", "III" over to the power and energy distributing circuit "R1". The latter or a control circuit "R2" senses the power requirement of motor 5 over its central unit 100 and primarily feeds motor 5 with the power it needs, according to the input signal on the connection or conductor 10*a* and generated output signal on the connection or conductor 10*b* so as thereby to load the stationary system "III", "s1" and supplement the power and energy requirements over battery setting "II", "B".

Connecting in parallel the power "III", "s1" taken out of the vehicle externally and the power "I", "G" and/or "II", "B" generated in the vehicle can here be carried out over circuits "R1" and control circuit "R2" and with the assistance of power control circuit 100.

Information about a desired speed and thereto related power of vehicle 1 is supplied to power central circuit 100 over conductor 10*a*, and circuit "R1" is affected over conductor 10*b* via internal circuits which are not shown and the function of the control circuit "R2" and control equipment 10.

FIG. 3 shows an end view of a vehicle 1, (1*b*) with its downwardly directed current collector or remover 4 in mechanical and electrical cooperation with the two live contact surfaces, as conductors, rails or strips 4*a'*, 4*b* associated with road portion 2*a*1' and a connection 4*c* to ground.

FIG. 4 shows an electric switching arrangement "K1", in which roadway section or portion after roadway section or portion 2*a*1, 2*a*2, 2*a*3 and 2*a*1', 2*a*2' and 2*a*3', respectively, with their station or stations "s1", "s2", "s3" and "s1'", s2" and "s3", respectively, can be activated and made to conduct power as voltage from one and the same controlled power source "III", 42 over switching means and switches 43*a*, 44*a*, and 45*a* for one stretch of a roadway 2*a* and 43*a'*, 44*a'* and 45*a'* along the opposite stretch of a roadway 2*b*, depending on whether a vehicle 1, 1*b* will pass along the electrically separate but with longitudinal tracks or grooves coordinated roadway 2*a*, 2*b* sections or portions.

For this a number of switches or connecting means for connecting and disconnecting stations "s1", "s2" . . . will be needed, wherein this connecting and disconnecting can occur over stationary sensors (not shown) related to the section or portion of the roadway.

The present invention and its detecting arrangement will now be described more specifically with reference to FIGS. 5 to 8, respectively.

Figure 5:
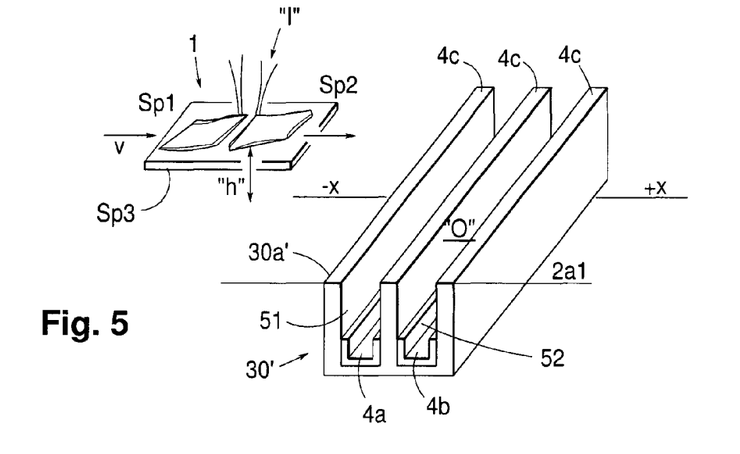
FIG. 5 illustrates an embodiment of a detecting arrangement adapted as a metal detector in accordance with the present invention, wherein a canalization allotted to the roadway is made of a metal, steel, and exhibits two tracks with introduced conductors, which may be subjected to electric voltage, and with a double coil allotted to the vehicle for sensing a variable magnetic field generated by a third coil surrounding the arrangement with the double coils.

Thus, FIG. 5 shows an arrangement in which one, two, or more coils Sp1, Sp2, sensing a magnetically disturbed field, are vehicle-related, wherein tracks 51, 52 are formed in a canalization or rail 30' consisting of metal and having its upper portions 30*a*' intended to connect to the roadway 2*a*1 of the roadway section 30.

A third coil Sp3 is adapted to surround coils Sp1 and Sp2, respectively, so as to generate a magnetic field.

Coils Sp1, Sp2, which are related to vehicle 1, are adapted to sense the magnetic field changed by the passage over rail 30' and, at a "0"-value, to actuate current collector 4 over control equipment 10 by means of allotted assistant motors 7, (8), for cooperation with the track or tracks and the conductors 4*a*, 4*b* introduced into two tracks 51, 52 and being supplied with voltage.

The distance "h" between the metal portions related to roadway 2*a*1 for the canalization and the coils Sp1 related to the vehicle can be adapted to less than 15 centimeters, such as between 10 and 1 centimeters.

Thus, FIG. 5 illustrates that said coils consist of two coils Sp1, Sp2 sensing the magnetic field and being disposed after each other across the driving direction of the vehicle and a third coil Sp3 through which a current (and alternating current) is to pass for generating a magnetic field which successively is to be disturbed by rail 30'.

Control equipment 20 is adapted, when the magnetic field from the two coils Sp1 and Sp2 operating against each other has been reduced and begins to increase, so as at "0" to affect the auxiliary motors 7, (8) to lower the current collector 4 to contact with conductors 4*a*, 4*b*, subjected to voltage.

Control equipment 10 is also adapted to discern between a minimum value and a maximum value and/or a "0"-value serving to identify a false track from false values. The two coils Sp1, Sp2 (but also coil Sp3) are oriented and intended to be displaced "V" relative to tracks 51, 52 and/or to road portion 2*a*1.

The principle of the invention is based on the insight that by positioning rail 30' in road section 2*a*1 a detector 16 adjacent to current collector 4 can detect a changed magnetic field by means of coils Sp1 and Sp2, respectively, and thereby at a "0"-passage for generated voltage localize where the tracks 51, 52 are positioned.

In order to avoid mistakes a frequency which normally does not occur is utilized. Network frequency and harmonics of the network frequency should be avoided. In this manner the detectors can be made very selective by filtering in narrow bands and with high amplification.

Figure 6:
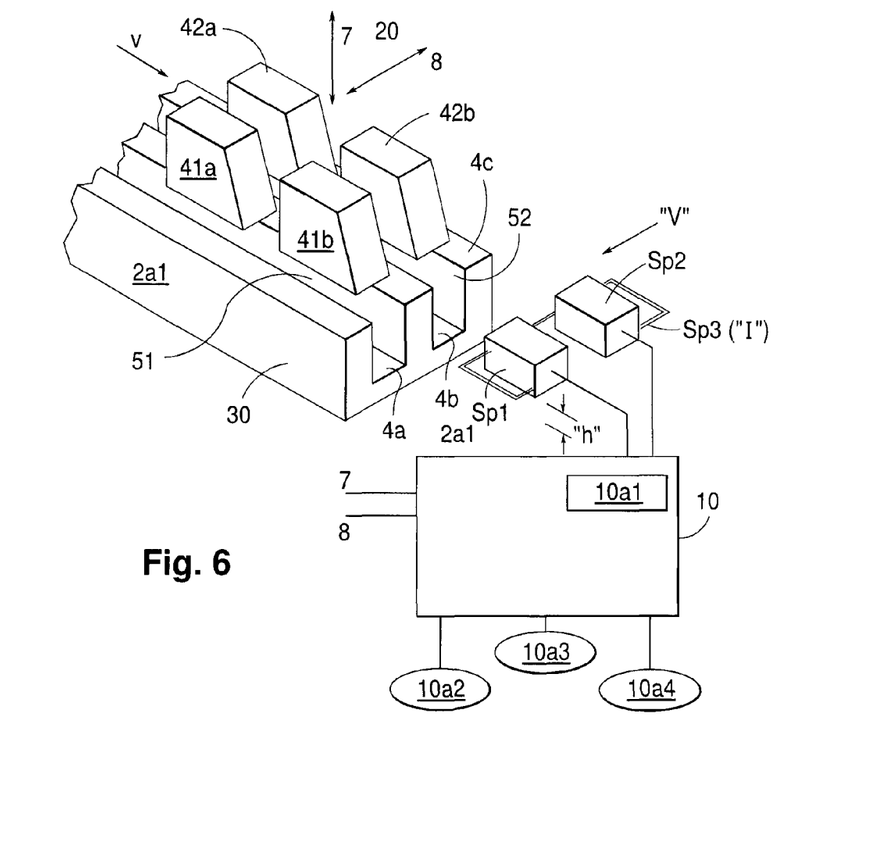
FIG. 6 shows a perspective view of the embodiment of FIG. 5 with two coil sensing variable magnetic fields, said coils being adapted to control equipment for independence of stored criteria being able to actuate a first assistant motor for bringing the current collectors down for cooperation with electric conductors or vice versa and/or to be able to make a second assistant motor give the current collectors horizontal direction over the tracks with the electric conductors.

Thus, FIG. 6 has the purpose of showing the embodiment of FIG. 5 more specifically in a perspective view.

It will be seen in FIG. 6 that a slightly modified embodiment can find use in other embodiments having one or more coils Sp1, Sp2 and/or Sp3, respectively.

One, two, or more magnetic fields generated by an electric current "I" occur over coil Sp3, whereas over coils Sp1 and Sp2, respectively, a variation of the magnetic field is sensed when the latter is disturbed by canalization 30' and all coils are related to vehicles.

Said tracks 51, 52 are made in a rail 30' consisting of metal, whose upper portions 30a' are adapted to engage the roadway of road section 2a1.

Rail 30' is made of a steel material or the like and with internal insulation and conductors 4a, 4b.

FIG. 6 illustrates a condition in which pairs of current collectors 41a, 41b for a first track 51 are disposed over said track 51.

Current collectors 42a, 42b in pairs for a second track 52 are disposed directly over track 52.

The bottom of track 51 supports the conductor 4a, which may be subjected to voltage or which is subjected to voltage, whereas the bottom of track 52 supports conductor 4b.

According to the instructions of the invention and with reference to the embodiment of FIG. 5 the existence of two coils Sp1 and Sp2 sensing the change of the magnetic field is indicated, which coils are firmly related to current conductors 41a, 41b and 42a, 42b, respectively, and are to follow along in the horizontal movement of the current collectors for detecting the existence of and the instantaneous position of the tracks 51 and 52 firmly related to roadway 2a1.

The magnetic field is generated by a third coil Sp3.

The sensed signals from coils Sp1 and Sp2, which are dependent of the instantaneous magnetic field, are supplied to control equipment 10 as input signals.

Over a calculating circuit 10a1 and in considering stored criteria in a memory, an output for actuating auxiliary motor 7 so as to lower current collectors 41a, 41b and 42a, 42b, respectively, down towards and for electric cooperation with conductors 4a, 4b is generated.

Calculating circuit 10a1 can also generate an output signal for actuating auxiliary motor 8.

Magnetic fields are stored in memory 10a2 depending on the horizontal distance (−x; +x) from tracks 51, 52, and the vertical distance "h" is stored in memory 10a3 whereas other relevant criteria are stored in memory 10a4.

Figure 7:
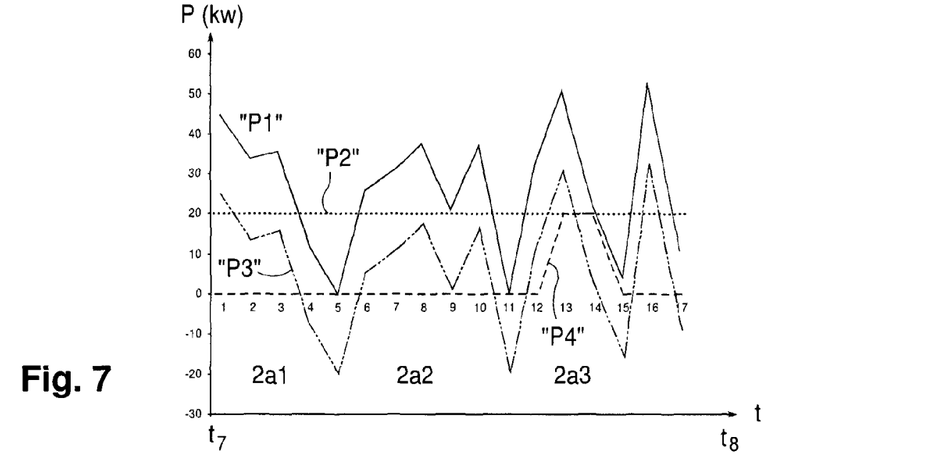
FIG. 7 shows, similarly to FIG. 1D, a diagram of power versus time, illustrating the momentary power withdrawal while the vehicle passes from roadway section to roadway section.

With reference to FIG. 7, the latter illustrates a diagram of power/time valid between times $t_7$ and $t_8$ when vehicle 1 is to pass road sections 2a1, 2a with different requirements of power.

Thus, curve "P1" illustrates the distribution in time of the necessary variable power to motor 5 of vehicle 1 in kW, curve "P2" intends to illustrate the power level (here chosen to be constant) from the third source of energy III, "s1", curve "P3" illustrates the varying power that battery set "II"; "B" stands for, and curve "P4" illustrates the temperable power that the first power source "I", i.a. "G" can generate.

Figure 8:
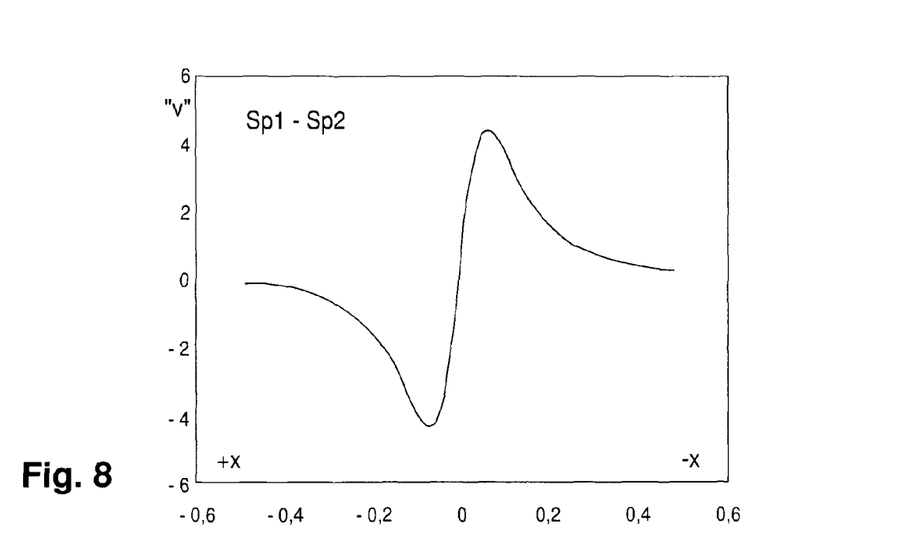
FIG. 8 shows a variation of a magnetic field as a variation in voltage in dependence of the distance between the coils sensing the varying magnetic field and being opposingly connected to each other.

FIG. 8 illustrates the negative total voltage from coils Sp1-Sp2 in a curve showing voltage and distance, as these coils are successively moved from a position "−x" past value "0" and along to a position "+x".

At the "0"-value of voltage "V" the current collector 4 is to be activated.

The invention thus indicates connecting coil Sp3 to a generator, whereby a current of high frequency will pass through the coil. A high-frequency magnetic field is generated and passes through the two coils Sp1 and Sp2, respectively. In the respective coils Sp1 and Sp2 individual voltages are induced. By connecting coils Sp1 and Sp2 in such manner that the voltages cancel each other the total voltage will be "0" if the coils are of equal size and are located at equal distances from the rail.

When coils Sp1, Sp2 and Sp3 come close to a rail 30' of metal, the magnetic field will be effected so that the symmetry will disturbed. This results in that the detecting coil Sp2, which is closest to rail 30', will have a higher magnetic field, whereby a higher voltage will be induced in this coil.

If coils Sp1, Sp2, and Sp3, respectively, are located exactly over rail 30' symmetry will, however, occur again.

This can be utilized for detecting with great precision that current collector 4 is located over track 51, 52.

If coils Sp1, Sp2 are moved further away, the unbalance will increase (+x) again, but now coil Sp1 receives a stronger signal, which results in the phase position shifting.

This creates the possibility of indicating in which direction the current collector 4 is to move in order to be positioned immediately above the track.

This becomes possible by coil Sp3 being able to be utilized as a phase reference in a phase-correct rectifier.

FIG. 8 shows how a phase-correct rectified voltage "V" looks when the coil arrangement Sp1, Sp2, and Sp3, respectively, is moved over rail 30' and its track 51, 52.

The following rules are utilized in control equipment 10 for controlling the contact or current collector 4:
 1. If the voltage "V" is negative according to FIG. 8, then contact 4 is to be moved to the right.
 2. If the voltage is positive, contact 4 is moved to the left.
 3. When the voltage is zero, contact 4 is lowered down to track 51, 52 on the condition that the absolute value of the voltage shortly before has been high.

The invention is of course not limited to the embodiment disclosed above as an example, and it can be subjected to modifications within the frame of the inventive concept illustrated in the following.

Is should be particularly noted that each shown unit and/or circuit can be combined with each other illustrated unit and/or circuit within the frame of being able to reach the desired technical function.

Some of the following reference numerals have been introduced into FIGS. 1 to 4;
a. 1. Vehicle illustrated as a Ford Model A.
b. 1b. Truck
c. 1c. Trailer to truck "b".
d. 2. Stretch of a roadway
e. 2a. Roadway in one traveling direction
f. 2b. Roadway in an opposite traveling direction
g. 2a1. Roadway section in one traveling direction
h. 2a1'. Roadway section in an opposite direction
i. 3. Steering equipment
j. 4. Vehicle related contact means as current remover
k. 4a. Electrical conductive first rail
l. 4b. Electrical conductive second rail
m. 4c. Roadway section related electrical conductor
n. 4a'. Electrical conductive first surface
o. 4b'. Electrical conductive second surface
p. 5. Vehicle related DC-motor
q. 6. Support for vehicle related contact means (j)
r. 7, 8. Auxiliary motors
s. 10. Control equipment for contact means (j)
t. 30. Canalization for electric conductors (k, l, m.) and including grooves (u, v.)
u. 51. First roadway section related groove
v. 52. Second roadway section related groove
w. 100. Power control circuit
x. "I". First vehicle related power source (Generator)
y. "II". Second vehicle related power source (Battery set.)

z. "III". Third power source, vehicle external (Ground Station)
aa. "F". Driver (not shown.)
bb. "R1". Energy distributing and three power sources controlling circuit
cc. "R2". Control circuit for energy distribution (Speed control)
dd. "5". Vehicle and roadways related system

The invention claimed is:

1. A vehicle-related arrangement for metal detection and using an arm-shaped contact means related to a systems for propelling an electrically propellable vehicle, powered by one or several batteries or a set of batteries, along a roadway comprising a plurality of roadway sections or portions, the system comprising:
"a" a plurality of roadway portions for subdividing the roadway, into said roadway sections, wherein each one of these roadway sections comprises one or more elongated tracks or slits having conductors introduced therein adapted to be supplied with current and put under voltage, and being connectable over a switch to one or more vehicle-external electric power sources, including vehicle-external electric stations, for thereby enabling charging of said set of batteries belonging to the vehicle, but primarily driving the vehicle along the roadway and its roadway sections, and
"b" one or more driveable or propellable vehicles which may be driven by means of an electric motor or motors, with each of the respective vehicles comprising a control circuit adapted for necessary distribution of power, adapted for creating a required power and/or speed control, wherein said vehicle is provided on its underneath side with contact means comprising current collectors which are displaceable up and down and sideways, in relation to the direction of transportation of the vehicle,
wherein said elongated track or tracks and its conductors extend along the roadway and the roadway sections, and wherein said contact means is coordinated with a vehicle-related control equipment for creating an adaptation of the contact means so as to at least offer a mechanical and electrical contact with said conductors,
wherein coordination between the conductors put under voltage, belonging to the roadway section, and the contact means of the vehicle occurs via coordinated current collectors, such as in the form of contact springs, adapted for mechanical and electrical cooperation with respective ones of the conductors put under voltage,
wherein the detecting arrangement comprises one or more coils arranged for sensing the variation of the magnetic field, based on a horizontal distance between the coils and metal parts belonging to the one or more elongated tracks and/or a vertical distance between the coils and the one or more elongated tracks, and wherein the coils are coordinated with a control equipment.

2. Detecting arrangement in accordance with claim 1, wherein one, two or more coils, generating a magnetic field, are arranged on the vehicle and said elongated tracks are formed in a rail consisting of metal, the upper portions of which are intended to engage the roadway of the roadway section.

3. Detecting arrangement in accordance with claim 1, wherein two coils arranged on the vehicle are adapted to sense the magnetic field and to act on current collector by means of associated assisting motors and control equipment to bring the current collection into mechanical and electrical contact with the elongated tracks and the conductors.

4. Detecting arrangement in accordance with claim 3, wherein the control equipment is adapted to sense when a generated counter voltage from the coils and from the relevant magnetic field has decreased and begins to increase towards "0"-potential and thereafter to control the assisting motors to lower the current collector into contact with conductors, put under voltage.

5. Detecting arrangement in accordance with claim 4, wherein two coils are disposed close to each other and surrounded by a third coil, fed by an alternating voltage.

6. Detecting arrangement in accordance with claim 1, wherein the distance between the roadway and the coils related to the vehicle is below 15 cm, preferable between 10 and 1 cm.

7. Detecting arrangement in accordance with claim 1, wherein said coil comprises two coil sections and one coil for generating the magnetic field and these are positioned adjacent to each other transverse to the driving direction of the vehicle.

8. Detecting arrangement in accordance with claim 7, wherein the control equipment is adapted to discern a minimum value, a maximum value and/or a "0"-value valid for identifying a track from false measuring values.

9. Detecting arrangement in accordance with claim 1, wherein the control equipment is adapted to control the assisting motors to lower the current collector into contact with the conductors, put under voltage, when the sensed magnetic field decreases and thereafter begins to increase towards "0"-potential.

* * * * *